United States Patent
Thevasahayam (10) Patent No.: US 9,834,687 B2
(45) Date of Patent: Dec. 5, 2017

(54) TRANSPARENT HEAT REFLECTIVE COATINGS AND METHODS OF THEIR MANUFACTURE AND USE

(71) Applicant: EMPIRE TECHNOLOGY DEVELOPMENT LLC, Wilmington, DE (US)

(72) Inventor: Arockiadoss Thevasahayam, Tamilnadu (IN)

(73) Assignee: Empire Technology Development LLC, Wilmington, DE (US)

( * ) Notice: Subject to any disclaimer, the term of this patent is extended or adjusted under 35 U.S.C. 154(b) by 6 days.

(21) Appl. No.: 14/905,815

(22) PCT Filed: Jul. 15, 2014

(86) PCT No.: PCT/IB2014/063102
§ 371 (c)(1),
(2) Date: Jan. 17, 2016

(87) PCT Pub. No.: WO2015/008213
PCT Pub. Date: Jan. 22, 2015

(65) Prior Publication Data
US 2016/0160053 A1   Jun. 9, 2016

(30) Foreign Application Priority Data

Jul. 17, 2013   (IN) ............................ 3183/CHE/2013

(51) Int. Cl.
| | | |
|---|---|---|
| C07F 7/08 | (2006.01) |
| C09D 5/33 | (2006.01) |
| C03C 17/30 | (2006.01) |
| C08K 3/28 | (2006.01) |
| B82Y 40/00 | (2011.01) |
| B82Y 30/00 | (2011.01) |
| C08K 3/22 | (2006.01) |

(52) U.S. Cl.
CPC ............. *C09D 5/004* (2013.01); *C03C 17/30* (2013.01); *C08K 3/28* (2013.01); *B82Y 30/00* (2013.01); *B82Y 40/00* (2013.01); *C03C 2217/20* (2013.01); *C03C 2217/70* (2013.01); *C03C 2218/11* (2013.01); *C08K 2003/2227* (2013.01); *C08K 2003/2241* (2013.01)

(58) Field of Classification Search
CPC ............ C09D 5/004; C03C 17/30; C08K 3/28
USPC ........................................................ 556/10
See application file for complete search history.

(56) References Cited

U.S. PATENT DOCUMENTS

| | | |
|---|---|---|
| 3,634,288 A | 1/1972 | Youngs |
| 3,951,525 A | 4/1976 | Ballentine |
| 7,585,331 B2 | 9/2009 | Lai et al. |
| 8,048,394 B2 * | 11/2011 | Yano ...................... B01J 20/103 423/335 |
| 8,114,516 B2 | 2/2012 | Shiao et al. |
| 2013/0175026 A1 * | 7/2013 | Chakraborty .......... C08J 9/0071 166/228 |
| 2013/0200299 A1 | 8/2013 | Mazyar et al. |

OTHER PUBLICATIONS

How to make a digital camera see infrared light, accessed at https://www.youtube.com/watch?feature=endscreen&v=dvCzbPVXZWk&NR=1, Updated on Oct. 9, 2009, pp. 1-3.
3M™ Scotch-Brite™ Heavy Duty Hand Pad 7440, accessed at http://solutions.3mindia.co.in/wps/portal/3M/en_IN/Abrasive_Systems/Home/Products/one/?PC_Z7_RJH9U5230G9160ICKVGQFA28O0000000_nid=RJP7ZHJ25Pbe85LLPK4D6Kgl, accessed on Jan. 7, 2016, p. 1.
Glass Manufacturing, Mineral Products Industry, accessed at http://www3.epa.gov/ttnchie1/ap42/ch11/final/c11s15.pdf, accessed on Jan. 7, 2016, pp. 1-10.
Window Genie Residential Window Tint, accessed at http://web.archive.org/web/20130116010518/http://www.windowgenie.com/window-film/index.php, accessed on Jan. 7, 2016, pp. 2.
Clawson, Trends in Automotive Glass, Glass Fabrication Engineering, accessed at http://projects.nfstc.org/trace/2009/presentations/4-clawson-glass.pdf, accessed on Jan. 7, 2016, pp. 1-18.
Goncalves, How to turn a webcam into a nightvision camera, accessed at https://web.archive.org/web/20120419142018/http://www.youtube.com/watch?v=8G0V62tuPek&feature=related, Jul. 18, 2008, pp. 1-2.
International Search Report and Written Opinion for International Application No. PCT/IB2014/063102 dated Apr. 7, 2015.
Kim et al., Developing a Testing Method for Antimicrobial Efficacy on TiO2 Photocatalytic Products, Environmental Engineering Research (2008), 13(3):136-140.

* cited by examiner

*Primary Examiner* — Sudhakar Katakam
*Assistant Examiner* — Kofi Adzamli
(74) *Attorney, Agent, or Firm* — Pepper Hamilton LLP (57) ABSTRACT

A nano-composite material for coating glass, as well as methods of its manufacture and use, are disclosed. The composite may be composed of a first metal oxide bridging a silicone oil moiety and an anionic surfactant moiety, and a second metal oxide bound to the silicone oil moiety. The composite may be fabricated by heating a first metal oxide and a second metal oxide with silicone oil, followed by the addition of a mixture of the surfactant and an oxidizing solution. The composite may be mixed with a suitable solvent and applied to a hot glass sheet. A glass coated with such a composite may transmit visible light, absorb some ultraviolet light, and reflect some near infrared light. The optical characteristics of the coated glass may be used to reduce heat in a glass-enclosed area by reducing the amount of infrared and ultraviolet light transmitted through the glass.

13 Claims, 5 Drawing Sheets

TRANSPARENT HEAT REFLECTIVE COATINGS AND METHODS OF THEIR MANUFACTURE AND USE

CROSS-REFERENCE TO RELATED APPLICATIONS

This application is a U.S. National Stage filing under 35 U.S.C. §371 of International Application No. PCT/M2014/063102 filed on Jul. 15, 2014 entitled "TRANSPARENT HEAT REFLECTIVE COATINGS AND METHODS OF THEIR MANUFACTURE AND USE" which claims priority from India Patent Application No. 3183/CHE/2013, filed on Jul. 17, 2013 also entitled "TRANSPARENT HEAT REFLECTIVE COATINGS AND METHODS OF THEIR MANUFACTURE AND USE", the contents of both of which are incorporated herein in their entireties.

BACKGROUND

Solar energy that reaches the earth includes wavelengths of about 300 nanometers (nm) to about 2500 nm. About 5% of this energy is in the ultraviolet range (about 300 nm to about 400 nm). About 46% of the total energy of the sun is in the visible spectrum (about 400 nm to about 780 nm), and the remaining about 49% is in the infrared range (about 780 nm to about 2500 nm). Radiation in this region may be invisible but can still be perceived as heat. Untreated glass is typically transparent to infrared radiation, and consequently infrared radiation from sunlight transmitted through a window may result in significant heat gain within a building or other enclosure. Additionally, ultraviolet radiation may also penetrate a glass window and may be converted to infrared radiation within the enclosure due to greenhouse effects. In order to maintain room habitability, cooling systems, such as HVAC systems, may be used to counter the increased heat due to the infrared radiation build-up. In regions with high insulation, significant costs may be associated with air conditioning required to counteract the amount of room heat derived from window-transmitted solar energy.

Frequently, darkly tinted or reflective window coatings have been used to block infrared radiation entering through a glass window. However, such coatings may substantially reduce the amount of normal visible light, and may, therefore, alter or distort the outside view by a room's occupants.

Thus, there is a need for a low cost and environmentally friendly coating that can be applied to glass or incorporated during glass manufacturing that can reflect heat but still permit high transmission of visible light.

SUMMARY

As used herein, an aqueous nitrogen-containing solution refers to an aqueous solution including one or more of ammonium, a hydrazine, or a short-chain aliphatic primary amine.

As used herein, an oxidizing solution refers to an aqueous solution including one or more of a peroxide, a di- or tri-oxygen ion, or a di- or tri-oxygen free radical.

In an embodiment, a method for making a heat-reflecting nano-composite material may include contacting, in a reaction vessel, a first metal oxide and a second metal oxide with an ammonia solution and a silicon oil to form a first mixture, heating the first mixture in the reaction vessel, contacting a long-chain organic anionic surfactant with an oxidizing solution such as a peroxide solution to form a second mixture, reducing the temperature of the first mixture, adding, dropwise, the second mixture to the first mixture to form a third mixture, heating and stirring the third mixture, cooling the third mixture to an ambient temperature, thereby forming the nano-composite material, and washing the nano-composite material in a solvent and isolating the nano-composite material from the cooled third mixture.

In an embodiment, a heat-reflecting nano-composite material may include a silicone oil moiety, a long-chain organic anionic surfactant moiety, a first metal cation, and a second metal cation, in which the first metal cation may be bonded to the long-chain organic anionic surfactant moiety via an alkoxide bridge and to the silicone oil moiety via a first siloxide bridge, and further in which the second metal cation may be bonded to the silicone oil moiety via at least a second siloxide bridge.

In another embodiment, a method of coating a glass object with a heat-reflecting nano-composite material may include contacting at least one surface of a heated glass with a solution comprising dispersed particles of a heat-reflecting nano-composite. The heat-reflecting nano-composite may include a silicone oil moiety, a long-chain organic anionic surfactant moiety, a first metal cation, and a second metal cation, in which the first metal cation may be bonded to the long-chain organic anionic surfactant moiety via an alkoxide bridge and to the silicone oil moiety via a first siloxide bridge, and further in which the second metal cation may be bonded to the silicone oil moiety via at least a second siloxide bridge.

DETAILED DESCRIPTION

Heat trapping by windows may pose significant environmental issues especially in areas with high solar insulation. Typical glass windows may be transparent to infrared radiation, allowing such radiation to enter into buildings and other enclosed spaces (such as vehicles). The result of such radiation being trapped within an enclosed space may include raising the interior temperature, leading to inhospitable conditions, as well as causing heat damage to objects, such as fabrics and furniture, within the enclosed space. Ultraviolet radiation in the range of about 300 nm to about 400 nm may also penetrate glass windows. In addition to potentially causing damage to materials within the enclosed space, ultraviolet radiation may be converted to infrared radiation through a greenhouse effect, thereby further increasing the heat load within the space. Such a heat load may be mitigated by the use of air conditioning systems which may require enormous amounts of electric power. It is, thus, apparent that a material that shields an interior space from both infrared and ultraviolet radiation may lead to a reduction of the overall power consumption of a building by reducing the load on air conditioning systems.

In some cases, blinds and/or light absorbing coatings may be used to reduce the transmission of infrared and ultraviolet radiation through a window. However, such devices frequently reduce the availability of visible light as well, either by obscuring the view of a person within the enclosure, or by generally reducing the amount of visible light transmitted through the window. The general architectural and aesthetic rational for windows is especially to provide a viewer inside the enclosure with natural lighting and an appreciation of the exterior environment. Thus, a coating that is transparent in the visible spectral range (about 400 nm to about 780 nm) while reflecting or absorbing both the ultraviolet and infrared components of sunlight is desirable.

Disclosed below is a nano-composite material, as well as methods for making and using that material, that possesses the above disclosed optical properties.

Figure 1:
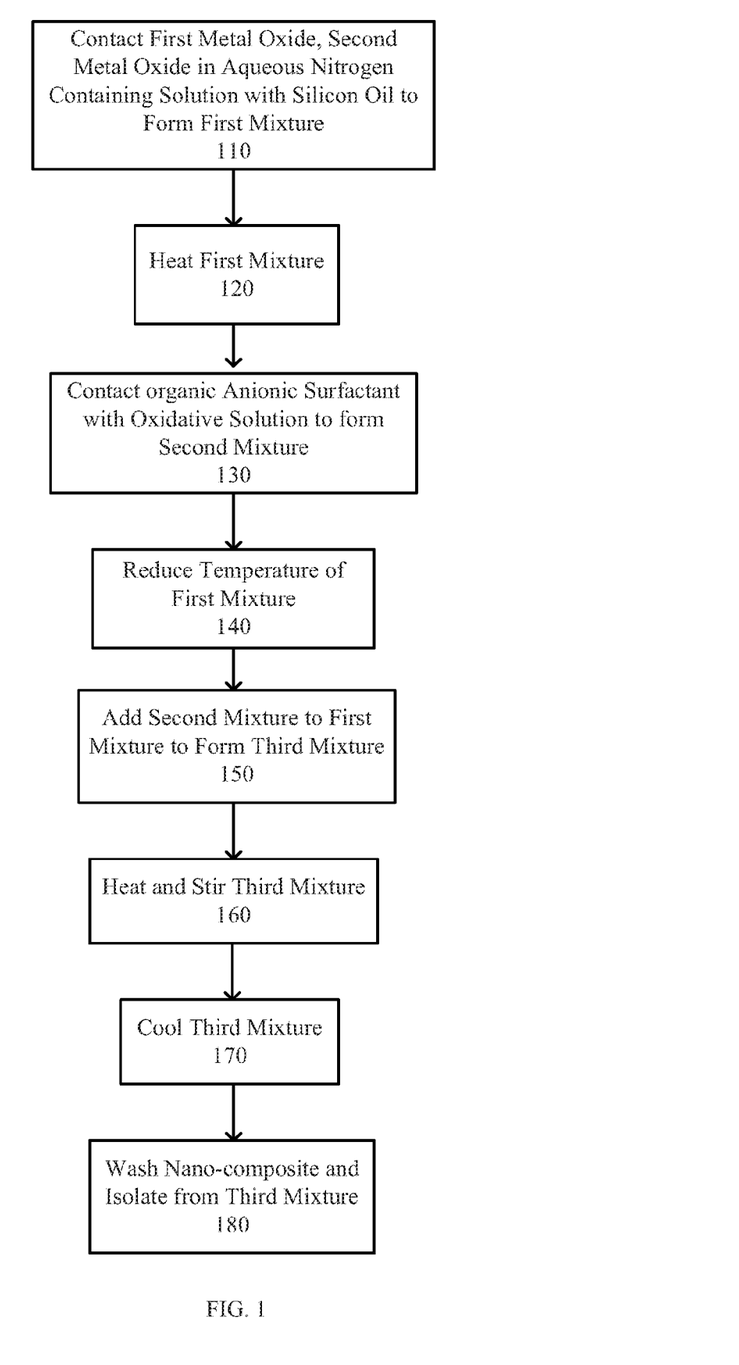
FIG. 1 is a flow chart illustrating an example of a method of manufacturing a heat-reflecting nano-composite material in accordance with the present disclosure.

FIG. 1 is a flow chart of an exemplary method for the fabrication of a nano-composite material capable of reflecting infrared radiation as well as absorbing ultraviolet radiation. A first mixture may be formed by contacting 110 and heating a combination of a first metal oxide and a second metal oxide in a solution including an aqueous nitrogen containing solution, such as an ammonium solution or a hydrazine solution, and a silicon oil.

In some non-limiting embodiments, the first metal oxide may include an ultraviolet light absorbing metal oxide, such as one or more of titanium oxide and tantalum oxide. In some non-limiting embodiments, the second metal oxide may include a heat reflective metal oxide, including one or more of: aluminum oxide, silicon oxide, tungsten oxide, vanadium oxide, silver oxide, and chromium oxide. In one non-limiting example, the first metal oxide may have a weight ratio to the second metal oxide of about 1:1 to about 1:3. Non-limiting examples of the weight ratio of the first metal oxide to the second metal oxide may include about 1:1, about 1:1.25, about 1:1.5, about 1:1.75, about 1:2, about 1:2.25, about 1:2.5, about 1:2.75, about 1:3, or ranges between any two of these values. In one non-limiting example, the first metal oxide may have a weight ratio to the second metal oxide of about 1:1.

In one non-limiting example, the nitrogen containing solution may include an ammonium solution. Other examples of nitrogen containing solutions may include, without limitation, one or more of: a hydrazine solution and a solution of a short-chain aliphatic primary amine. Examples of hydrazine solutions may include, without limitation, one or more of hydrazine, monomethyl hydrazine, monoethyl hydrazine, monopropyl hydrazine, N,N'-dimethylhydrazine, N,N'-diethyl hydrazine, N,N-dimethyl hydrazine, N-ethyl N'-methyl hydrazine, and other short-chain aliphatic N-substituted hydrazines. Examples of short-chain aliphatic primary amine solutions may include, without limitation, one or more of: methyl amine, ethyl amine, propyl amine, butyl amine, and other short-chain aliphatic primary amines. In one non-limiting example, the nitrogen containing solution may include an ammonia solution having a volume ratio to the silicon oil of about 1:0.2 to about 1:3. Non-limiting examples of the volume ratio of the nitrogen-containing solution to the silicon oil may include about 1:0.2, about 1:0.5, about 1:0.7, about 1:1, about 1:1.2, about 1:1.5, about 1:1.7, about 1:2, about 1:2.2, about 1:2.5, about 1:2.7, about 1:3, or ranges between any two of these values. In another non-limiting example, the nitrogen contain solution may include an ammonia solution having a volume ratio to the silicon oil of about 1:0.2.

The first mixture may be heated 120 at a temperature of about 175 degrees C. to about 225 degrees C., and for about 15 minutes to about 1 hour. Non-limiting examples of the temperature at which the first mixture may be heated 120 may include about 175 degrees C., about 185 degrees C., about 195 degrees C., about 200 degrees C., about 205 degrees C., about 215 degrees C., about 225 degrees C., or ranges between any two of these values. Non-limiting examples of the time during which the first mixture may be heated 120 may include about 15 minutes, about 20 minutes, about 25 minutes, about 30 minutes, about 35 minutes, about 40 minutes, about 45 minutes, about 50 minutes, about 55 minutes, about 1 hour, or ranges between any two of these values. In one non-limiting example, the first mixture may be heated at a temperature of about 200 degrees C. In another non-limiting example, the first mixture may be heated for about 15 minutes to about 30 minutes. In another non-limiting example, the first mixture may be heated for about 1 hour. In one non-limiting embodiment, heating 120 the first mixture may include refluxing the first mixture for example in a refluxing vessel such as a Soxhlet extractor. Refluxing the first mixture may result in removing water and other by-products created during the heating 120 step.

A second mixture may be formed by contacting 130 an organic anionic surfactant with an oxidizing solution. Non-limiting embodiments of organic anionic surfactants may include one or more of: a sulfate, a phosphate, and a carbonate. Non-limiting embodiments of organic anionic surfactants may further include surfactants composed of an un-branched aliphatic chain having about 12 carbon atoms to about 20 carbon atoms. Non-limiting examples of organic anionic surfactants may further include one or more of: sodium dodecyl sulfate, sodium laureth sulfate, sodium dodecyl benzene sulfonate, ammonium lauryl sulfate, sodium lauryl sulfate, and sodium myreth sulfate. In some non-limiting examples, a weight/volume ratio of the organic anionic surfactant to the silicon oil may be about 1:1 mg/ml to about 100:1 mg/ml. Non-limiting examples of the weight/volume ratio of the organic anionic surfactant to the silicon oil may include about 1:1 mg/ml, about 2:1 mg/ml, about 5:1 mg/ml, about 10:1 mg/ml, about 20:1 mg/ml, about 50:1 mg/ml, about 100:1 mg/ml, or ranges between any two of these values. In another non-limiting example, the weight/volume ratio of the organic anionic surfactant to the silicon oil may be about 1:1 mg/ml.

In some non-limiting examples, the oxidizing solution may be composed of a peroxide, such as hydrogen peroxide or benzoyl peroxide, and/or a solution of di- and tri-oxygen ions and/or free radicals. Additional non-limiting examples of such oxidizing solutions may further include one or more of: a superoxide, a dioxygenyl, ozone, and an ozonide. In one non-limiting embodiment of the second mixture, the silicone oil may have a volume ratio to an oxidizing solution of about 1:1.5 to about 1:2.5. Non-limiting examples of a volume ratio of the silicone oil to the oxidizing solution may include, about 1:1.5, about 1:1.7, about 1:1.9, about 1:2, about 1:2.2, about 1:2.4, about 1:2.5, or ranges between any two of these values. In one non-limiting embodiment of the second mixture, the silicone oil may have a volume ratio to a peroxide solution of about 1:2.

The temperature of the first mixture may be reduced 140 after heating. In one non-limiting embodiment, the temperature of the first mixture may be reduced 140 by about 50 degrees C. from the heating temperature. Non-limiting examples of the temperature to which the first mixture may be reduced 140 may include about 125 degrees C., about 135 degrees C., about 145 degrees C., about 150 degrees C., about 155 degrees C., about 165 degrees C., about 175 degrees C., or ranges between any two of these values. In one non-limiting example, the temperature of the first mixture may be reduced 140 to about 150 degrees C. after heating.

The second mixture may be added 150 to the first mixture, thereby forming a third mixture. In some non-limiting embodiments, second mixture may be added 150 to the first mixture in small volume increments. In some non-limiting examples, adding 150 the second mixture to the first mixture in small volume increments may be accomplished by adding the second mixture in a series of aliquots or in a drop-wise manner to the first mixture. In some other non-limiting embodiments, the second mixture may be added 150 to the first mixture in a continuous manner. In one non-limiting example, the second mixture may be added 150 to the first mixture by adding the second mixture in a low volumetric flow-rate to the first mixture. Without being bound by theory, the addition of the small volume increments of the second mixture added 150 to the first mixture may result in clusters of granular nano-composite material. The nano-composite material granules may have a size of about 50 nm to about 100 nm. Non-limiting examples of the size of the nano-composite granules may include about 50 nm, about 60 nm, about 70 nm, about 80 nm, about 90 nm, about 100 nm, or ranges between any two of these values. The third mixture may be heated 160 and stirred. In one non-limiting embodiment, the third mixture may be heated 160 and stirred at a temperature about 50 degrees C. less than the heating temperature. In one non-limiting example, the third mixture may be heated 160 and stirred at a temperature about 150 degrees C. Non-limiting examples of the temperature at which the third mixture may be heated 160 may include about 125 degrees C., about 135 degrees C., about 145 degrees C., about 150 degrees C., about 155 degrees C., about 165 degrees C., about 175 degrees C., or ranges between any two of these values. In one non-limiting embodiment, the third mixture may be heated 160 and stirred for about 15 minutes to about 1 hour. In one non-limiting embodiment, the third mixture may be heated 160 and stirred about one hour. Non-limiting examples of the time during which the third mixture may be heated 160 may include about 15 minutes, about 20 minutes, about 25 minutes, about 30 minutes, about 35 minutes, about 40 minutes, about 45 minutes, about 50 minutes, about 55 minutes, about 1 hour, or ranges between any two of these values. In still another non-limiting embodiment, the third mixture may be heated 160 and stirred about 15 minutes to about 30 minutes.

The third mixture may be cooled 170 to about ambient temperature, thereby forming a suspension of the nano-composite material. The nano-composite material may be washed 180 in a washing solvent and isolated from the third mixture. In one non-limiting example, the nano-composite material may be isolated from the third mixture by filtration. In another non-limiting example, the nano-composite material may be isolated from the third mixture by centrifugation. In yet another non-limiting example, the nano-composite material may be isolated from the third mixture by allowing the nano-composite material to settle under gravity and decanting the third mixture from the nano-composite material. As one non-limiting example, the washing solvent may be distilled water. As one non-limiting example, washing 180 the nano-composite material with a washing solvent may be performed at least one time. As another non-limiting example, washing 180 the nano-composite material with a washing solvent may be performed about five times to about seven times.

The heat-reflecting nano-composite material may include a structure having a silicon oil moiety and a long-chain organic anionic surfactant moiety. The silicon oil moiety may have a first link to a first metal cation, and the first metal cation may form a second link to the surfactant moiety. The first link and the second link may include one or more functional groups and may comprise the same functional group or different functional groups. In addition, the nano-composite material may include a second metal cation forming one or more additional links via one or more functional groups to the anionic surfactant moiety. Multiple functional groups linking the second metal cation to the surfactant moiety may include the same functional group or different functional groups. The functional group or groups linking the second metal cation to the organic anionic surfactant moiety may also be the same as or different from the functional group linking the first metal cation to the anionic surfactant moiety.

Figure 2:
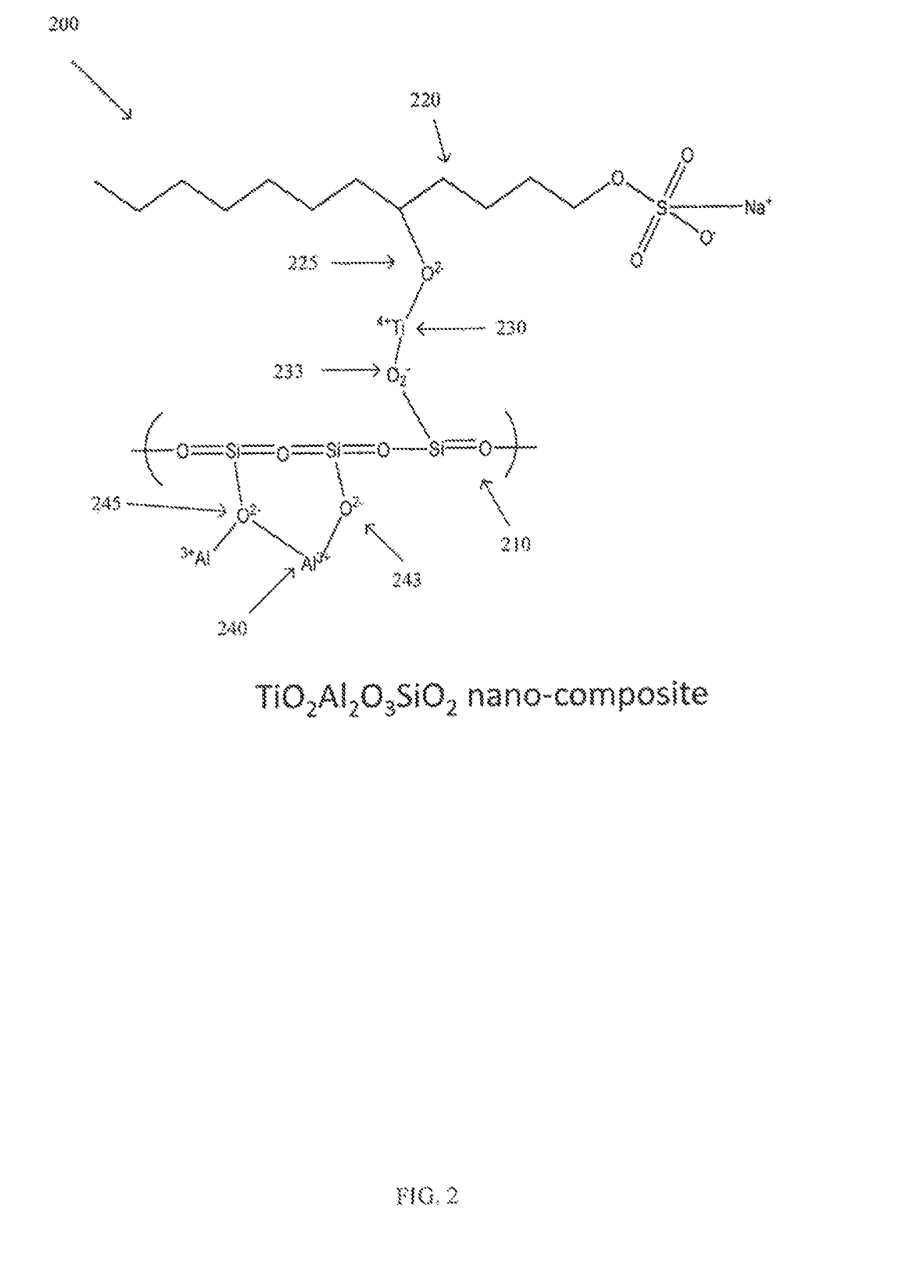
FIG. 2 illustrates an exemplary structure of a nano-composite material in accordance with the present disclosure.

A non-limiting example of a structure of the heat-reflecting nano-composite material 200 is depicted in FIG. 2. The heat-reflecting nano-composite 200 may be composed of a silicone oil moiety 210, a long-chain organic anionic surfactant moiety 220, a first metal cation 230, and a second metal cation 240. The first metal cation 230 may be bonded to the long-chain organic anionic surfactant moiety 220 via an alkoxide bridge 225, and to the silicone oil moiety 210 via a first siloxide bridge 233. Additionally, the second metal cation 240 may be bonded to the silicone oil moiety 210 via at least a second siloxide bridge 243. In one alternative non-limiting embodiment, the second metal cation 240 may be bonded to the silicone oil moiety 210 via an additional third siloxide bridge 245.

In some non-limiting examples of the structure of the heat-reflecting nano-composite material 200, the first metal cation 230 may be one or more of a titanium cation and a tantalum cation. In some non-limiting examples of the structure of the heat-reflecting nano-composite material 200, the second metal cation 240 may be one or more of: an aluminum cation, a silicon cation, a tungsten cation, a vanadium cation, a silver cation, and a chromium cation. In yet another non-limiting example of the structure of the heat-reflecting nano-composite material 200, the organic anionic surfactant moiety 220 may include one or more of: a sulfate, a phosphate, and a carbonate. Some additional non-limiting examples of the structure of the heat-reflecting nano-composite material 200 may include the organic anionic surfactant moiety 220 having an un-branched aliphatic chain having about 12 carbon atoms to about 20 carbon atoms. In some additional non-limiting examples of the structure of the heat-reflecting nano-composite material 200, the organic anionic surfactant moiety 220 may include one or more of: sodium dodecyl sulfate and sodium laureth sulfate, sodium dodecyl benzene sulfonate, ammonium lauryl sulfate, sodium lauryl sulfate, and sodium myreth sulfate. In one non-limiting embodiment, the heat-reflecting nano-composite material 200 may be composed of particles having a diameter of about 50 nm to about 100 nm. Non-limiting examples of the size of the nano-composite particles may include about 50 nm, about 60 nm, about 70 nm, about 80 nm, about 90 nm, about 100 nm, or ranges between any two of these values.

An article, such as a window or other glass object, may be coated with the heat-reflecting nano-composite material by contacting at least one surface of the glass object with a solution composed of a plurality of dispersed particles of the heat-reflecting nano-composite dispersed in a solvent. In one embodiment, the glass object may be heated to a desired temperature prior to the solution contacting it. In one embodiment, a pre-formed glass object may be heated to attain a desired temperature. Alternatively, the glass object may be hot molten glass, and the solution may be applied to the glass surface during the glass fabrication process, such as a Pilkington process. In some non-limiting embodiments, the nano-composite solution may be applied to the heated glass object by one or more techniques such as by spin coating, spray coating, thermal evaporation, and dip coating.

The nano-composite solution may be composed of a mixture of a heat-reflecting nano-composite particles dispersed in a solvent. Non-limiting examples of such solvent may include one or more of ethyl alcohol, xylene, dimethyl formamide, dimethyl sulfoxide, and chloroform. In some non-limiting examples, the weight:volume ratio of the heat-reflecting nano-composite particles to the solvent may be about 8 mg/ml to about 20 mg/ml. In some non-limiting examples, the weight:volume ratio of the heat-reflecting nano-composite particles to the solvent may be about 20 mg/ml. Non-limiting examples of the weight:volume ratio of the heat-reflecting nano-composite particles to the solvent may include about 8 mg/ml, about 10 mg/ml, about 12 mg/ml, about 14 mg/ml, about 16 mg/ml, about 18 mg/ml, about 20 mg/ml, or ranges between any two of these values. The glass object may be heated to or held at a desired temperature greater than or about equal to the boiling point temperature of the nano-composite solution solvent so that the solvent may evaporate quickly upon contact with the glass object. In one non-limiting example, a nano-composite solution including ethanol (boiling point about 78 degrees C.) as the solvent may be applied to a glass object held at a desired temperature of about 150 degrees C.

In some non-limiting examples, the nano-composite solution may be formed by dispersing the heat-reflecting nano-composite particles in the solvent by means of one or more of: stirring, shaking, and sonicating. In some non-limiting examples, the solution may be sonicated at a power setting of about 170 W to about 500 W. Non-limiting examples of the sonication power setting may include about 170 W, about 200 W, about 250 W, about 300 W, about 350 W, about 400 W, about 450 W, about 500 W, or ranges between any two of these values. In one non-limiting example, the solution may be sonicated at a power setting of about 170 W. In some non-limiting examples, the solution may be sonicated for about 30 minutes to about 60 minutes. Non-limiting examples of the sonication time may include about 30 minutes, about 35 minutes, about 40 minutes, about 45 minutes, about 50 minutes, about 55 minutes, about 1 hour, or ranges between any two of these values. In one non-limiting example, the solution may be sonicated for about 30 minutes. As another non-limiting example, the solution may be sonicated with a 50% duty cycle.

EXAMPLES

Example 1: A Method of Fabricating a Heat-Reflecting Nano-Composite

In a flat bottom flask, about 10 g $TiO_2$ and about 10 g $Al_2O_3$ were mixed with about 50 ml of an ammonia solution and about 10 ml silicon oil (first mixture). The first mixture was then heated to about 200 degrees C. in a Soxhlet separator for about 1 hour. The temperature of the first mixture was reduced to about 150 degrees C. A second mixture was made composed of about 10 mg sodium lauryl sulfate and about 20 ml hydrogen peroxide. The second mixture was added dropwise, using a burette, to the first mixture thereby forming a third mixture. The temperature of the third mixture was maintained at about 150 degrees C. and stirred for about one hour. The resulting solution was cooled to ambient temperature, and the nano-composite was collected and washed with distilled water for about 5 to about 7 times. The washed nano-composite was collected and dried to a powder.

Example 2: A Batch-Wise Method of Fabricating a Heat-Reflecting Nano-Composite

A first mixture may be prepared by combining about a 5:1 volume ratio solution of ammonia solution to silicon oil to a mixture having about a 1:1 weight ratio of $TiO_2$ to $Al_2O_3$. The first mixture may have about a 1000:1 weight:volume ratio of $TiO_2$ to the silicon oil. The first mixture may be heated or refluxed as disclosed above in Example 1.

A second mixture may be prepared by combining sodium lauryl sulfate and hydrogen peroxide in about a 1:2 weight:volume ratio.

The first mixture may be combined with the second mixture in about a 3:1 volume ratio to provide a third mixture. The third mixture may then be heated and stirred together as disclosed above in Example 1. Depending on the final volume of the third mixture, the heating and stirring step may take about 2 hours or longer.

Example 3: A Continuous-Flow Method of Fabricating a Heat-Reflecting Nano-Composite A first mixture and a second mixture may be prepared as disclosed above in Example 2. The first mixture may be combined with the second mixture in about a 3:1 volume ratio to form a third mixture in a circulating mixing apparatus. A non-limiting example of such a circulating mixing apparatus may include a heating/mixing chamber and one or more conduits to circulate the third mixture into and from the heating/mixing chamber. The one or more conduits may have characteristics to induce turbulent flow of the third mixture as it is conducted through the conduit(s). The third mixture may be heated in the heating/mixing chamber to attain a temperature of about 150 degrees C. Depending on the final volume of the third mixture, the heating and circulating step may take about 2 hours. Under some circulating and heating conditions, the time of the heating and circulating step may take less than about 2 hours.

Example 4: A Method of Fabricating a Heat-Reflecting Glass Surface

A suspension of about 1 g of the nano-composite fabricated as in Example 1 was dispersed in about 50 ml of ethanol or 1% xylene in ethanol. The ethanol or 1% xylene in ethanol suspension was sonicated at 170 W for a total of 30 minutes with a 50% duty cycle (3 minutes on, 3 minutes off) to form a nano-composite colloid. A glass sheet with dimension of about 15 cm×15 cm×5 mm was heated on a hot plate to about 150 degrees C., and the nano-composite colloid was sprayed on the surface of the glass.

Figure 3:
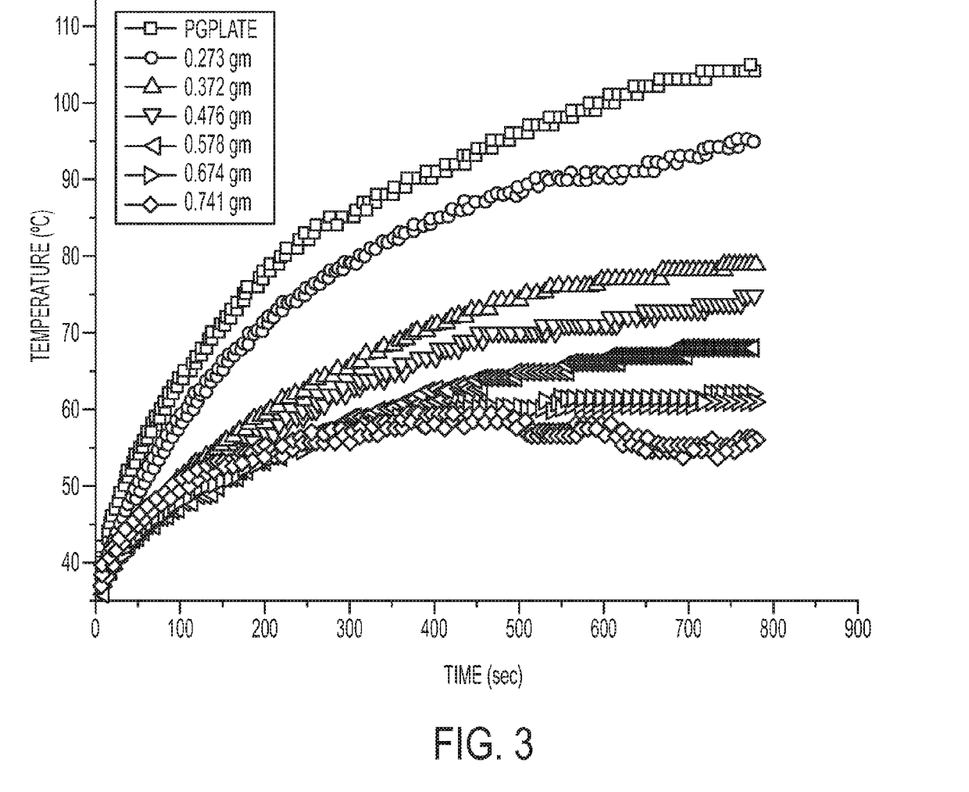
FIG. 3 is a graph illustrating examples of a temperature in a space measured over time of heat radiation, the radiation transmitted through glass having different coating densities of a heat-reflecting nano-composite material in accordance with the present disclosure.
Figure 4:
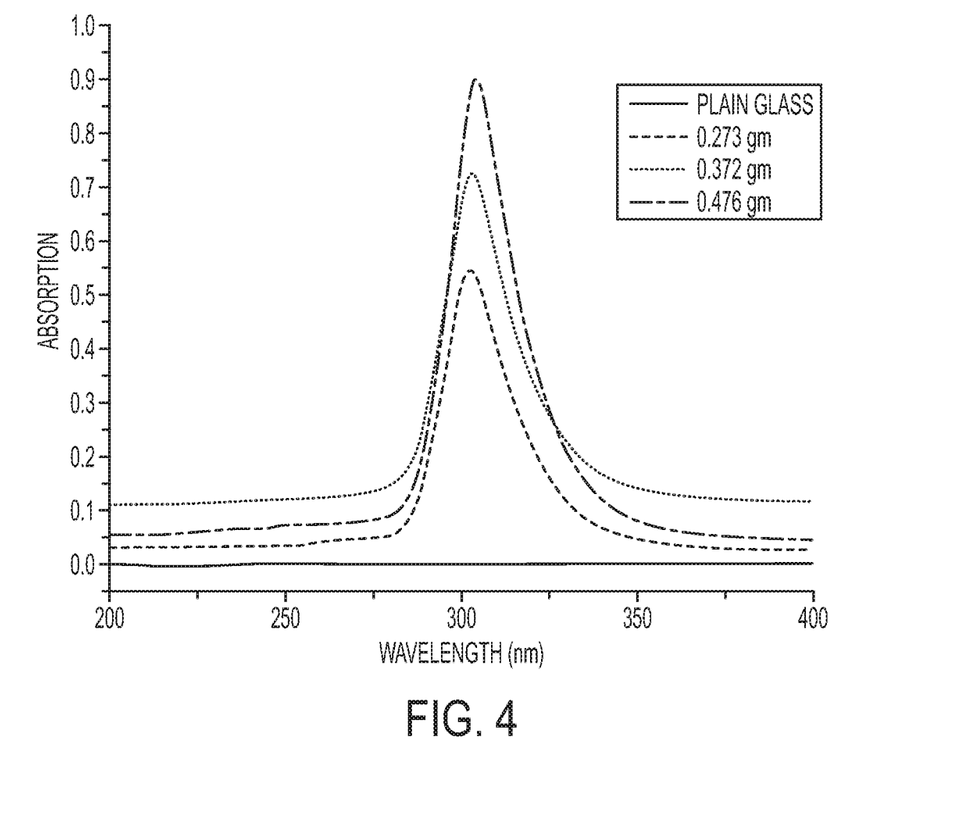
FIG. 4 is a graph illustrating examples of ultraviolet light absorbance spectra of glass having different coating densities of a heat-reflecting nano-composite material in accordance with the present disclosure.
Figure 5:
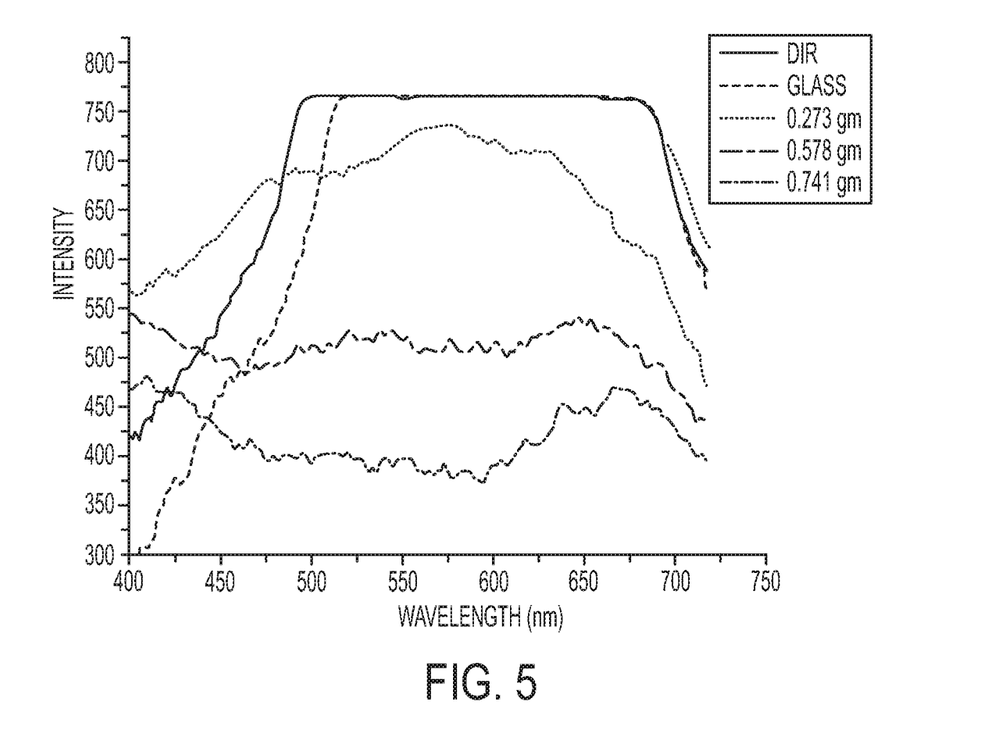
FIG. 5 is a graph illustrating examples of visible light transmittance spectra of glass having different coating densities of a heat-reflecting nano-composite material in accordance with the present disclosure.

FIGS. 3-5 present data regarding the characteristics of the coated glass surface prepared as disclosed above.

FIG. 3 depicts the effect of heat applied to a glass plate having different amounts of applied nano-composite colloid. A radiant source provided the heat on the coated side of the glass, and a thermistor measured the temperature at the uncoated side of the glass over a period of time. For an uncoated glass plate, it may be observed that the measured temperature demonstrated a rapid increase over the first 200 seconds from ambient temperature (about 37 degrees C.) to about 75 degrees C., and continued to increase to well over 100 degrees C. by the end of the experiment time at about 800 seconds. As depicted in the graph in FIG. 3, plates covered with increasing amount of the nano-composite demonstrated significant reduction in the measured temperature over time. Plates having the greatest amount of applied nano-composite (0.674 g and 0.741 g) resulted in temperature measurements at the uncoated side apparently reaching an equilibrium value of about 55 degrees C. to about 60 degrees C. after about 400 seconds of heat exposure.

FIG. 4 depicts ultraviolet absorption characteristics of a glass plate having different amounts of applied nano-composite colloid. Uncoated glass demonstrates apparently no ultraviolet absorption in the 275 nm to 350 nm range and is thus transparent to those wavelengths. Coated glass shows absorption at around 305 nm dependent on the amount of nano-composite applied. It may be appreciated that such absorption characteristic may result in a decrease in ultraviolet radiation transmitted through the class. As a result, less ultraviolet damage may occur on the interior side of the glass, and less ultraviolet radiation may be converted to heat on the interior side of the glass as well.

FIG. 5 depicts visible light transmission characteristics of a glass plate having different amounts of applied nano-composite colloid. Uncoated glass is generally transparent to visible light in the 500 nm to 700 nm range. As depicted in FIG. 5, increasing amounts of applied nano-composite colloid may reduce visible light transmission through a glass plate. However, as illustrated in FIG. 5, at the greatest amount of nano-composite colloid application (about 0.74 g), visible light transmittance by the coated glass was reduced only about 50%. Of interest, it may be observed in FIG. 5 that the effect of the nano-composite on visible light transmittance was fairly uniform throughout the visible spectral range.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated in this disclosure, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, or compositions, which can, of course, vary. It is also to be understood that the terminology used in this disclosure is for the purpose of describing particular embodiments only, and is not intended to be limiting.

With respect to the use of substantially any plural and/or singular terms in this disclosure, those having skill in the art can translate from the plural to the singular and/or from the singular to the plural as is appropriate to the context and/or application. The various singular/plural permutations may be expressly set forth in this disclosure for sake of clarity.

It will be understood by those within the art that, in general, terms used in this disclosure, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups.

It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed in this disclosure also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed in this disclosure can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member.

From the foregoing, it will be appreciated that various embodiments of the present disclosure have been described for purposes of illustration, and that various modifications may be made without departing from the scope and spirit of the present disclosure. Accordingly, the various embodiments disclosed are not intended to be limiting, with the true scope and spirit being indicated by the following claims.

What is claimed is:

1. A method to make a nano-composite material, the method comprising:
    contacting a first metal oxide and a second metal oxide, with a nitrogen-containing solution and a silicon oil to form a first mixture;
    heating the first mixture at a first temperature of about 175° C. to 225° C.;
    contacting a long-chain organic anionic surfactant with an oxidizing solution to form a second mixture;
    reducing a temperature of the first mixture from the first temperature to a second temperature, wherein the second temperature is at least 50° C. less than the first temperature;
    adding the second mixture to the first mixture to form a third mixture;
    heating and stirring the third mixture at a third temperature, wherein the third temperature is at least 50° C. less than the first temperature;
    cooling the third mixture from the third temperature to an ambient temperature to form the nano-composite material therein; and
    washing the nano-composite material with a solvent and isolating the nano-composite material from the third mixture cooled to the ambient temperature.

2. The method of claim 1, wherein the contacting the first metal oxide and the second metal oxide, with the nitrogen-containing solution and the silicon oil comprises contacting with the first metal oxide comprising one or more of titanium oxide and tantalum oxide.

3. The method of claim 1, wherein the contacting the first metal oxide and the second metal oxide, with the nitrogen-containing solution and the silicon oil comprises contacting with the second metal oxide comprising one or more of: aluminum oxide, silicon oxide, tungsten oxide, vanadium oxide, silver oxide, and chromium oxide.

4. The method of claim 1, wherein the contacting the first metal oxide and the second metal oxide, with the nitrogen-containing solution and the silicon oil comprises contacting a weight ratio of the first metal oxide to the second metal oxide of about 1:1 to about 1:3.

5. The method of claim 1, wherein the contacting the first metal oxide and the second metal oxide, with the nitrogen-containing solution and the silicon oil comprises contacting with the nitrogen-containing solution comprising one or more of: an ammonium solution, a primary amine solution, and a hydrazine solution.

6. The method of claim 1, wherein the contacting the first metal oxide and the second metal oxide, with the nitrogen-containing solution and the silicon oil comprises contacting with the nitrogen-containing solution comprising one or more of: hydrazine, monomethyl hydrazine, monoethyl hydrazine, monopropyl hydrazine, N,N'-dimethyl hydrazine, N,N'-diethyl hydrazine, N,N-dimethyl hydrazine, and N-ethyl N'-methyl hydrazine.

7. The method of claim 1, wherein the contacting the first metal oxide and the second metal oxide, with the nitrogen-containing solution and the silicon oil comprises contacting a volume ratio of the nitrogen-containing solution to the silicon oil of about 1:0.2 to about 1:3.

8. The method of claim 1, wherein the contacting the long-chain organic anionic surfactant with the oxidizing solution comprises contacting with the long-chain organic anionic surfactant comprising one or more of: a sulfate, a phosphate, and a carbonate.

9. The method of claim 1, wherein the contacting the long-chain organic anionic surfactant with the oxidizing solution comprises contacting with the long-chain organic anionic surfactant comprising an un-branched aliphatic chain having about 12 carbon atoms to about 20 carbon atoms.

10. The method of claim 1, wherein the contacting the long-chain organic anionic surfactant with the oxidizing solution comprises contacting with the long-chain organic anionic surfactant comprising one or more of: sodium dodecyl sulfate, sodium laureth sulfate, sodium dodecyl benzene sulfonate, ammonium lauryl sulfate, sodium lauryl sulfate, and sodium myreth sulfate.

11. The method of claim 1, wherein the contacting the long-chain organic anionic surfactant with the oxidizing solution comprises contacting with the oxidizing solution comprising one or more of: hydrogen peroxide, benzoyl peroxide, a superoxide, a dioxygenyl, ozone, and an ozonide.

12. The method of claim 1, wherein the contacting the long-chain organic anionic surfactant with the oxidizing solution comprises contacting a weight to volume ratio of the organic anionic surfactant to the silicon oil of about 1:1 mg/ml to about 100:1 mg/ml.

13. The method of claim 1, wherein the contacting the long-chain organic anionic surfactant with the oxidizing solution comprises contacting a volume ratio of the silicone oil to the oxidizing solution of about 1:1.5 to about 1:2.5.

* * * * *

UNITED STATES PATENT AND TRADEMARK OFFICE
CERTIFICATE OF CORRECTION

PATENT NO. : 9,834,687 B2
APPLICATION NO. : 14/905815
DATED : December 5, 2017
INVENTOR(S) : Thevasahayam It is certified that error appears in the above-identified patent and that said Letters Patent is hereby corrected as shown below:

In the Specification

In Column 1, Lines 9-10, delete "Application No. PCT/M2014/063102" and insert
-- Application No. PCT/IB2014/063102 --, therefor.

Signed and Sealed this
Twelfth Day of June, 2018

Andrei Iancu
*Director of the United States Patent and Trademark Office*